E. R. KNIGHT.
GEAR CASING.
APPLICATION FILED JULY 3, 1914.
1,279,711.
Patented Sept. 24, 1918.
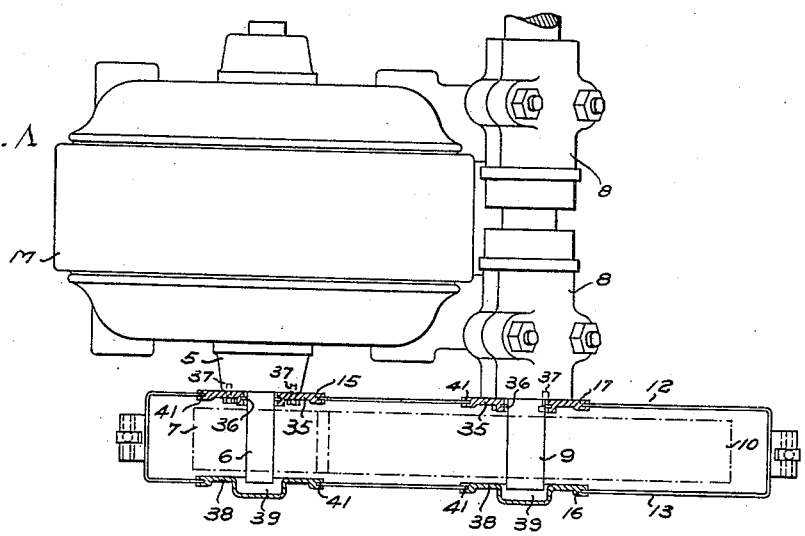
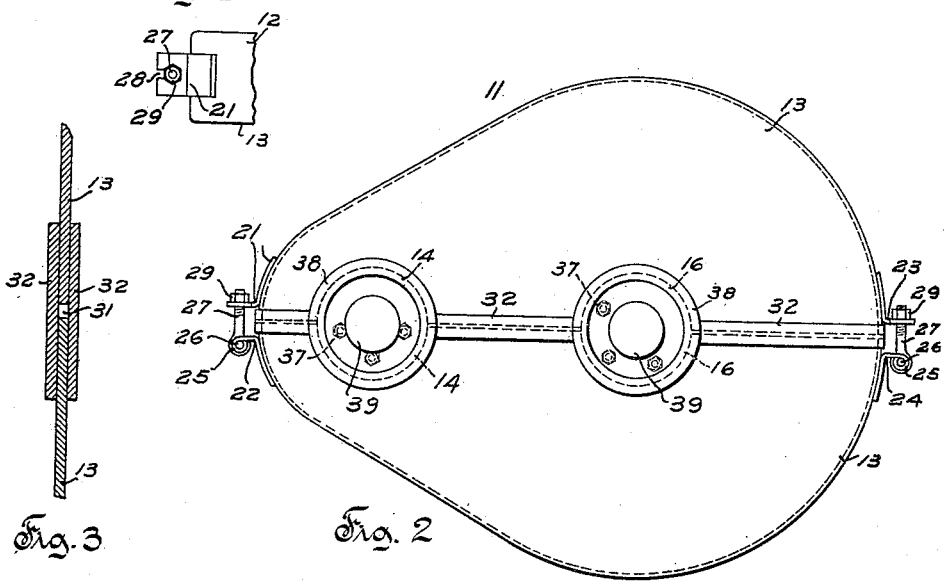

UNITED STATES PATENT OFFICE.

EARLE R. KNIGHT, OF NORWOOD, OHIO, ASSIGNOR TO ALLIS-CHALMERS MANUFACTURING COMPANY, OF MILWAUKEE, WISCONSIN, A CORPORATION OF DELAWARE.

GEAR-CASING.

1,279,711.  Specification of Letters Patent.  Patented Sept. 24, 1918.

Application filed July 3, 1914. Serial No. 848,973.

*To all whom it may concern:*

Be it known that I, EARLE R. KNIGHT, a citizen of the United States, residing at Norwood, in the county of Hamilton and State of Ohio, have invented a certain new and useful Improvement in Gear-Casings, of which the following is a specification.

This invention relates in general to gear case constructions, and has special reference to such constructions as are of particular utility in connection with electric motors, for protecting a pinion on the motor shaft and a gear driven thereby.

It is an object of this invention to provide an improved gear case construction which is of comparatively simple design and affords full and efficient protection for the gear parts, and can be removed or disassembled for inspection of the gears by an extremely simple operation.

It is a further object of this invention to provide an improved gear case construction which does not involve the use of separate brackets or supports for mounting the case in position.

These and other objects are attained by this invention, the various novel features of which will appear from the description and drawings disclosing one embodiment of such invention, and will be particularly pointed out in the claims.

In the accompanying drawings:

Figure 1 is a plan view of an electric motor with an attached jack-shaft support, a gear case construction, embodying this invention and used to protect the motor pinion and the gear on the jack-shaft, being shown in partial section.

Fig. 2 is a side view of the complete gear case, shown in part in Fig. 1.

Fig. 3 is a sectional view of a detail of construction of the gear case shown in Fig. 2.

Fig. 4 is a plan view of another detail of construction of the gear case shown in Fig. 2.

In the drawings, a motor M, having a bearing 5 for a shaft 6, provided with a pinion 7, is provided with supporting brackets 8 for a jack-shaft 9. The pinion 7 on the motor shaft meshes with a gear 10 on the shaft 9.

A gear case 11 is made up of two similar sections, each comprising side walls 12 and 13 and an end wall joining these side walls, being preferably secured thereto by welding. The side walls 12 and 13 are provided with alined semi-circular recesses 14, 15, 16, 17, the recesses 14 and 15 being in alinement and the recesses 16 and 17 being in alinement. It is to be noted that these recesses are so disposed that, when the two sections of the gear case are in operative position, the corresponding recesses in the two parts are in alinement or match to form central openings.

The upper section of the gear case is provided with extensions 21 and 23 disposed at opposite ends thereof adjacent the open side of the case section. These extensions are preferably formed by welding an angle piece of metal to the end wall. The lower section of the gear case is provided with extensions 22 and 24 so disposed as to lie opposite and adjacent to the extensions 21 and 23, respectively, when the sections are drawn together.

The projecting ends of the extensions 22 and 24 are preferably bent around so as to form bearings 25 for pins 26. Eye-bolts 27 are swiveled on the pins 26, and are adapted to enter open-ended slots 28 in the extensions 21 and 23 of the upper section, and to be retained therein by nuts 29 which serve to hold the upper and lower sections of the gear case together.

The upper section is provided with recesses 31, preferably formed by welding strips of material 32 to the inner and outer sides of the walls of this section. It will be obvious that, when the upper and lower sections are drawn together, the upper edge of the lower section will enter the recesses 31 of the upper section, to form a comparatively tight closure between the parts. It may be desirable to provide a packing strip in this recess or to mount such packing strip on the upper edge of the lower section.

With the construction described, it will be obvious that the gear case may be mounted at either end of the motor, or other machine, the motor shaft and jack-shaft being capable of passing through either pair of openings 14, 16 or 15, 17. Disks 35, provided with central openings of sufficient size to receive the shafts 6 and 9, are secured to the bearing portions 5 and 8, as by means of screws or bolts 37, which are threaded into the bearing portions, the shafts 6 and 9 passing through the openings in such disks. The walls about the openings in the disks 35 through which the shafts pass, may be provided with recesses 36 for receiving packing material to form tight closures with the shafts.

Disks 38, each preferably provided with an enlarged central portion on one side to form a recess 39 on the opposite side of sufficient size to receive the end of any shaft in connection with which the gear case is to be used, may be used for closing the openings in that side of the gear case that is to be remote from the bearings of the motor shaft.

The disks 35 and 38 are preferably of the same size and each is provided with a peripheral recess 41 to receive the edges of the upper and lower sections of the gear case.

In assembling the gear case, the disks 38 are first inserted in the proper openings in the lower section, the edges of this section fitting in the peripheral recesses 41 of the disks. The lower section is then drawn up until the edge of one side of the section is firmly seated in the peripheral recesses 41 of the disks 35, which, preferably, have previously been attached to the bearings of the motor shaft and jack-shaft, and the upper section is lowered to the position in which the lower edge of the corresponding side engages in the peripheral recesses 41 of the disks 35, and the other side thereof engages in the peripheral recesses 41 of the disks 38, which are held in place in the openings of the lower section. The sections are then clamped together and firmly secured in place by the bolts 27 and nuts 29, through their engagement with the oppositely disposed extensions 21, 22 and 23, 24 of the sections.

To remove the gear case or to disassemble the same for the purpose of inspection of the gears, one or both of the bolts 27 may be removed from engagement with the corresponding extensions 21 and 23, permitting removal of one or both of the gear case sections to any desired extent.

Where the bearings to which the disks 35 are attached, are of the type in which the upper portion is removed to permit inspection or removal of the shaft, the securing bolts or screws 37 may be disposed, as shown, so as to enter only the fixed portion of the bearing.

It will be obvious that the disks 38 may be frictionally held, or otherwise held in any suitable manner, in close association with either of the sections of the casing.

It should be understood that it is not desired to be limited to the exact details of construction shown and described, for obvious modifications within the scope of the appended claims will occur to a person skilled in the art.

It is claimed and desired to secure by Letters Patent:

1. In combination with a plurality of shafts and bearings therefor, members secured to said bearings and provided with openings through which said shafts pass, a casing in a plurality of sections and provided with recesses for the reception of said members, and means for clamping and securing said sections in place about said members.

2. In combination with a plurality of shafts and bearings therefor, members secured to said bearings and provided with peripheral recesses and with openings through which said shafts pass, a casing in a plurality of sections provided with recesses for the reception of said members, edges of said sections being adapted to fit in the recesses of said members, and means for clamping and securing said sections in place about said members.

3. A gear casing comprising a plurality of sections, said sections having alined recesses along adjacent edges forming a plurality of pairs of oppositely disposed openings when the sections are assembled, and interchangeable members some of which are perforate and others of which are imperforate adapted to fit said openings in the assembled casing, the perforate members forming means for supporting said casing.

4. A gear casing, comprising a plurality of sections, said sections having alined recesses along adjacent edges forming oppositely disposed openings when the casing sections are assembled, and interchangeable members adapted to closely fit said openings, the members on one side of the casing being provided with shaft-receiving openings and forming a means of attachment of said casing to the bearings of said shafts.

5. The combination of a shaft and bearing therefor, a casing comprising a plurality of sections having alined recesses to form an opening through one side of the assembled casing, a perforate member adapted to fit in said opening and be supported by said bearing and means for clamping said sections in engagement with said member.

6. The combination of a shaft and bearing therefor, a casing comprising a plurality of sections having alined recesses to form an opening through one side of the assembled casing, a perforate member provided with a peripheral recess adapted to fit in said opening and be supported by said bearing and means for clamping said sections in engagement with said member.

7. A gear casing comprising a plurality of sections, said sections having alined recesses along adjacent edges forming a plurality of pairs of oppositely disposed openings when the sections are assembled, the edge of one section being provided with recessed portions in alinement with the body portions of the sides of said section for the reception of the adjacent edges of the other section in the assembled condition of the casing, and interchangeable members some of which are perforate and others of which are imperforate adapted to fit said openings in the assembled casing, and means for clamping said sections together about said members.

8. A gear casing comprising a plurality of sections, said sections having alined recesses along adjacent edges of oppositely disposed walls forming oppositely disposed openings when the casing sections are assembled, and interchangeable members adapted to closely fit said openings, one of said members having a shaft-receiving opening and forming a means of attachment of the casing to a support, and the other of said members being substantially imperforate.

9. A gear casing comprising a plurality of sections, said sections having alined recesses along adjacent edges of oppositely disposed walls forming a pair of oppositely disposed openings when the sections are assembled, and interchangeable members at least one of which is provided with a shaft-receiving opening and adapted to fit said openings in the assembled casing, said perforate member when secured in fixed position forming a means for supporting the assembled casing.

10. A gear casing comprising sections having alined recesses along adjacent edges of oppositely disposed walls and forming an opening when the sections are assembled, discontinuous laterally displaced extensions along the edge of one of said sections, a member provided with a shaft-receiving opening adapted to fit said opening in the assembled casing and bridge the gap between said lateral extensions, the adjacent edges of the sections being thereby substantially completely covered.

11. A gear casing comprising sections having alined recesses along adjacent edges of oppositely disposed walls and forming an opening when the sections are assembled, discontinuous laterally displaced extensions along the edge of one of said sections, a member having a peripheral recess and provided with a shaft-receiving opening adapted to fit in said opening in the assembled casing and bridge the gap between said lateral extensions, adjacent edges of the sections being thereby substantially completely covered.

12. A gear casing comprising sections adapted to form a butt joint when assembled, said sections having alined recesses along adjacent edges of oppositely disposed walls and forming an opening when the sections are assembled, discontinuous laterally displaced extensions along the edge of one of said sections, a member provided with a shaft-receiving opening adapted to fit said opening in the assembled casing and bridge the gap between said lateral extensions, the adjacent edges of the sections being thereby substantially completely covered.

13. In combination with a machine having a shaft and a gear on said shaft, a second shaft, a gear thereon, a casing comprising a plurality of sections, each of said sections comprising side walls and a portion connecting said side walls, said side walls being recessed along the edges thereof, the recesses in the mutually-coöperative side walls of the sections being in alinement to form a pair of openings in each of two side walls of the assembled casing, members closely fitting in said openings in the side walls, the members in one side wall of said casing being perforate and receiving said shafts, said shaft-receiving members and the other members interchangeably fitting the openings in the side walls of said casing, and means for clamping the sections of said casing together about said shaft-receiving members to form an inclosure for said gears, and means for securing said shaft-receiving members in fixed position relative to said machine.

14. In combination with a machine having a shaft and a gear on said shaft, a second shaft, a gear thereon, a casing comprising a plurality of sections, each of said sections comprising side walls and a portion connecting said side walls, said side walls being recessed along the edges thereof, the recesses in the mutually-coöperative side walls of the sections being in alinement to form two openings in the assembled casing, members closely fitting in said openings in the side walls, said members being perforate and receiving said shaft, and means for clamping the sections of said casing about said members to form an inclosure for said gears, and means for securing said members in fixed position about said shafts, said members and the securing means therefor constituting a means for supporting said casing in operative position.

15. In an incasing member for motors, a plurality of sections having alined recesses adapted to form shaft-receiving openings when the sections are assembled, bearing members adapted to be operatively related to said sections in alinement with said openings and means for clamping the sections in operative relation to said bearing members.

In testimony whereof, the signature of the inventor is affixed hereto in the presence of two witnesses.

EARLE R. KNIGHT.

Witnesses:
 LOUIS C. NICHOLS,
 L. F. BOWER.